(12) United States Patent
Langeman

(10) Patent No.: US 11,279,856 B2
(45) Date of Patent: Mar. 22, 2022

(54) FILAMENT-BEARING MASKING TAPE

(71) Applicant: Langeman Manufacturing Limited, Kingsville (CA)

(72) Inventor: Gary D. Langeman, Kingsville (CA)

(73) Assignee: LANGEMAN MANUFACTURING LIMITED, Kingsville (CA)

( * ) Notice: Subject to any disclaimer, the term of this patent is extended or adjusted under 35 U.S.C. 154(b) by 148 days.

(21) Appl. No.: 16/882,610

(22) Filed: May 25, 2020

(65) Prior Publication Data

US 2020/0369920 A1 Nov. 26, 2020

Related U.S. Application Data

(60) Provisional application No. 62/852,710, filed on May 24, 2019.

(51) Int. Cl.
| | | |
|---|---|---|
| *C09J 7/21* | (2018.01) | |
| *C09J 7/20* | (2018.01) | |
| (Continued) | | |

(52) U.S. Cl.
CPC ............... *C09J 7/21* (2018.01); *B05B 12/24* (2018.02); *C09J 7/20* (2018.01); *C09J 7/203* (2018.01); *C09J 7/40* (2018.01); *C09J 2203/31* (2013.01); *C09J 2301/1242* (2020.08); *Y10T 428/14* (2015.01)

(58) Field of Classification Search
CPC ....... C09J 7/21; C09J 7/20; C09J 7/203; C09J 7/40; C09J 2203/31; C09J 2301/1242; C09J 2400/243; C09J 2400/283; C09J 2421/00; C09J 2423/046; C09J 2433/00; C09J 2483/00; C09J 2483/006; C09J 2423/10; B05B 12/24; Y10T 428/14
See application file for complete search history.

(56) References Cited

U.S. PATENT DOCUMENTS

| | | |
|---|---|---|
| 2,005,665 A | 5/1934 | Saignier |
| 2,771,385 A | 8/1954 | Humphner |
| (Continued) | | |

FOREIGN PATENT DOCUMENTS

| | | |
|---|---|---|
| EP | 1911527 B1 | 12/2001 |
| EP | 1570911 B1 | 3/2010 |
| JP | 2006233166 A * | 9/2006 |

OTHER PUBLICATIONS

PCT/CA2012/000108—Notification of Transmittal of the International Search Report and the Written Opinion of the International Search authority, or the Declaration, ISA/CA, dated Apr. 20, 2012, 13 pgs.

*Primary Examiner* — Patricia L. Nordmeyer
(74) *Attorney, Agent, or Firm* — Kagan Binder, PLLC

(57) ABSTRACT

Described is a filament-bearing masking tape extending longitudinally and formed from and including a filament and a base tape having a first edge and a second edge parallel to the first edge. The base tape includes a carrier having upper and lower sides and extending longitudinally with a first adhesive on the lower side having a first adhesive thickness, and a second adhesive having a second adhesive thickness greater than the first adhesive thickness on the upper side, and a release liner attached to the second adhesive. The filament extends longitudinally, parallel to the first edge of the base tape, closer to the first edge than to the second edge.

20 Claims, 3 Drawing Sheets

(51) Int. Cl.
    *B05B 12/24*      (2018.01)
    *C09J 7/40*       (2018.01)

(56) References Cited

U.S. PATENT DOCUMENTS

| | | | |
|---|---|---|---|
| 3,810,813 A | 5/1974 | Ellis | |
| 4,033,803 A | 7/1977 | Coder | |
| 4,201,799 A | 5/1980 | Stephens | |
| 4,255,469 A | 3/1981 | McGinness | |
| 4,720,011 A | 1/1988 | Canamero | |
| 4,844,962 A | 7/1989 | Mays et al. | |
| 4,921,028 A | 5/1990 | Schwartz | |
| 5,049,445 A | 9/1991 | Arvidsson et al. | |
| 5,045,618 A | 10/1991 | Kim | |
| 5,203,935 A | 4/1993 | May et al. | |
| 5,227,225 A | 7/1993 | Mamish | |
| 5,374,482 A | 12/1994 | Ozari et al. | |
| 5,466,500 A | 11/1995 | Pluim | |
| 5,786,028 A | 7/1998 | Cantwell | |
| 5,935,669 A | 8/1999 | Leeuwenburgh | |
| 6,017,079 A | 1/2000 | Warner | |
| 6,025,045 A | 2/2000 | Langeman | |
| 6,235,365 B1 | 5/2001 | Schaughency et al. | |
| 6,270,886 B1 | 8/2001 | Ono et al. | |
| 6,284,319 B1 | 9/2001 | Langeman | |
| 6,635,334 B1 | 10/2003 | Jackson et al. | |
| 6,818,251 B2 | 11/2004 | Bouic et al. | |
| 6,828,008 B2 | 12/2004 | Gruber | |
| 6,875,469 B2 | 4/2005 | Langeman | |
| 6,962,748 B2 | 11/2005 | Nickel | |
| 7,014,900 B2 | 3/2006 | Langeman | |
| 7,314,312 B2 | 1/2008 | Soderholm | |
| 7,445,828 B2 | 11/2008 | Sieber et al. | |
| 7,550,187 B2 | 6/2009 | Seth et al. | |
| 7,914,638 B2 | 3/2011 | Van Den Berghe et al. | |
| 8,029,895 B1 | 10/2011 | Heysek | |
| 8,187,407 B2 | 5/2012 | Van Den Berge et al. | |
| 8,361,615 B2 | 1/2013 | Van Den Berghe et al. | |
| 2002/0114946 A1 | 8/2002 | Nickel | |
| 2004/0013871 A1 | 1/2004 | Pannell | |
| 2004/0175527 A1 | 9/2004 | Shiota et al. | |
| 2005/0077003 A1 | 4/2005 | Gruber | |
| 2006/0266464 A1 | 11/2006 | White | |
| 2007/0284046 A1 | 12/2007 | Habisreitinger et al. | |
| 2008/0092483 A1 | 4/2008 | Osgood | |
| 2008/0193723 A1 | 8/2008 | Dureiko | |
| 2009/0074994 A1 | 3/2009 | McLean | |

\* cited by examiner

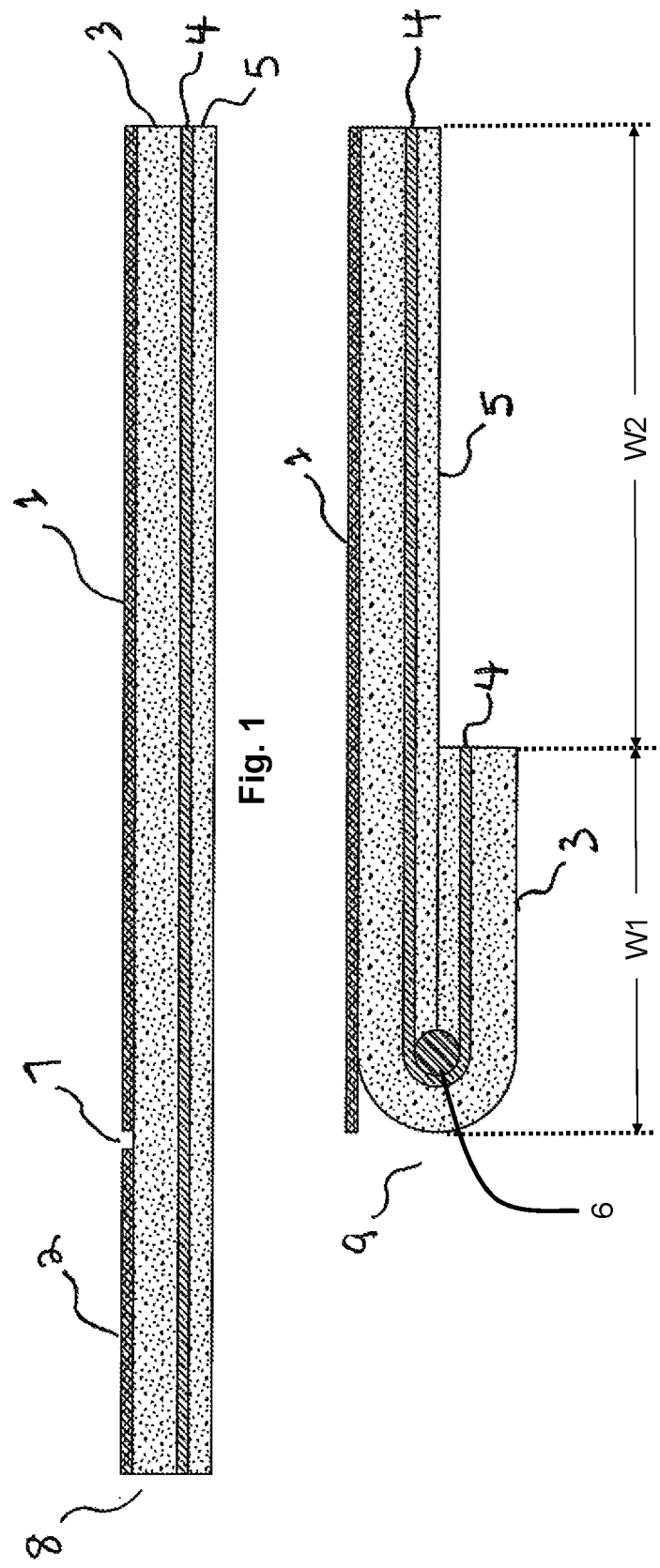

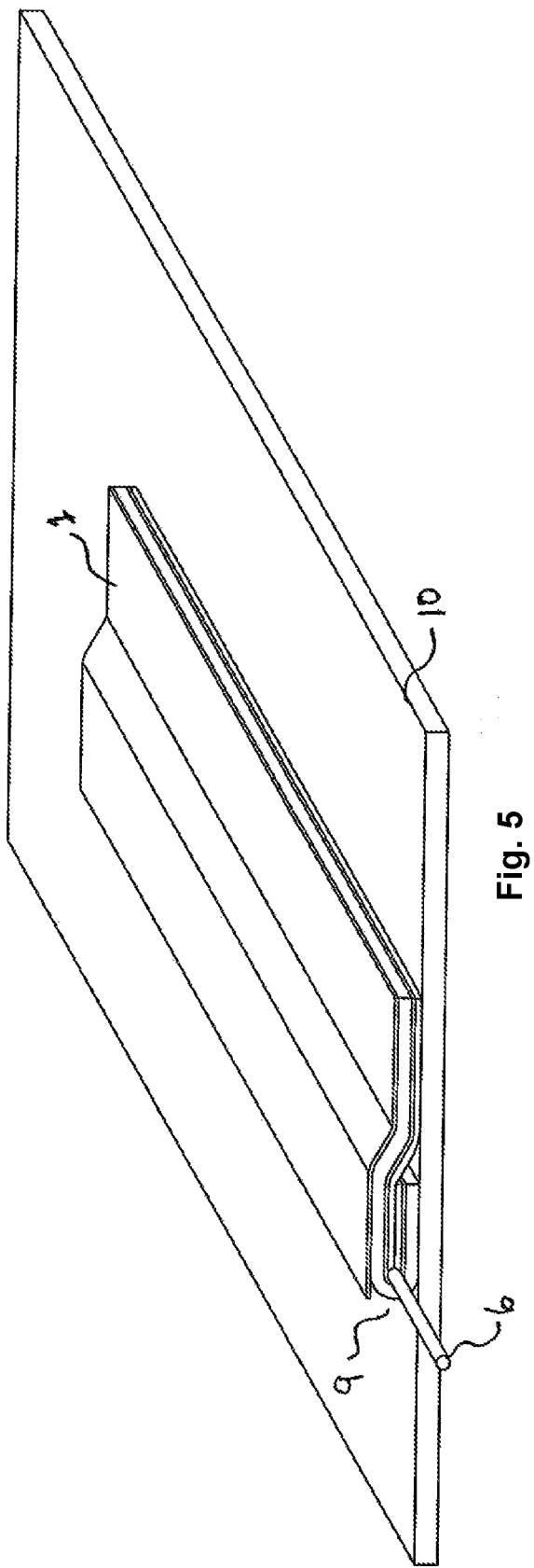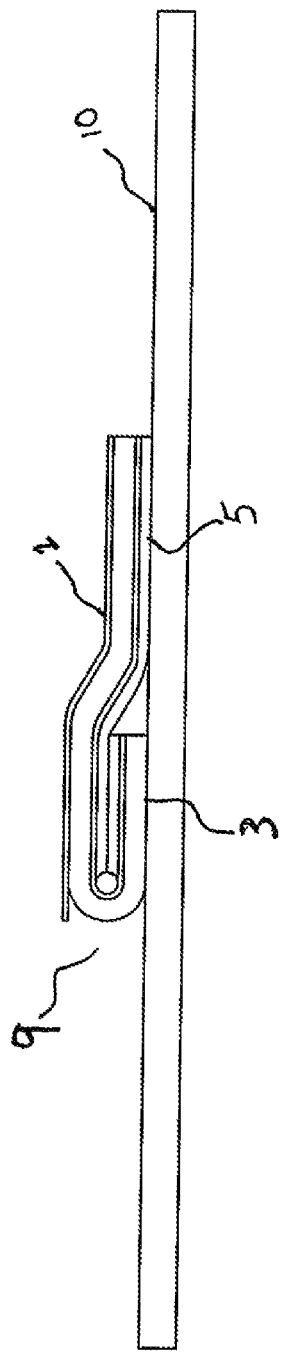

FILAMENT-BEARING MASKING TAPE

PRIORITY CLAIM

This application claims the benefit of U.S. Provisional Patent Application No. 62/852,710, filed May 24, 2019, the content of which is incorporated herein by reference in its entirety.

FIELD OF THE INVENTION

The present invention relates generally to masking tape for trimming coatings, such as polyurethane and paint, on surfaces.

BACKGROUND OF THE INVENTION

Masking tape is widely used by painters and others applying a coating to a surface in order to define a sharp edge on the portion of the surface being coated. The tape protects a portion of the surface that is not to be coated. Conventional masking tape is longitudinally extended with first and second parallel longitudinal edges and a pressure-sensitive adhesive layer formed on one side of a substrate, or backing. The adhesive layer permits the masking tape to be removably attached to a surface. The coating may then be applied to the surface so that the first longitudinal edge of the masking tape is also covered by the coating. The tape can then be removed, leaving a straight and well defined edge of the portion of the surface that is coated, corresponding to the position of the first longitudinal edge of the tape.

The pressure-sensitive adhesive is selected so that the tape can easily be removed from the surface. The substrate is typically made from paper and is hand-tearable. The tape is typically manufactured in rolls so that a user can unwind a length of tape and then hand-tear it transversely to remove a strip of tape from the roll.

The paper substrate may be saturated with a latex binder and then dried before the adhesive is applied in order to improve the tensile strength of the substrate to help prevent it from ripping when it is removed. A release coating may also be applied to the top side to facilitate removing tape from a roll.

Such masking tape is typically manufactured in relatively wide sheets that may be cut into narrow widths, such as one inch, and then fed to a rewinder for rolling onto a number of cores to form rolls.

It has become increasingly common to apply a curable coating, such as a polyurethane, to an exposed surface such as a wall, floor or automobile body to offer protection against, for example, corrosion, moisture and abrasion. These coatings are often applied by spraying, rolling or painting the coating material on to the surface to be protected, and allowing the coating material to dry or cure in place.

Applying such a rapidly drying or curing mixture to a surface to be protected permits a quick and relatively uniform application of the coating material to the entire surface and shortens the time required before the coated surface may be put to its normal or intended use. However, the coating must be applied relatively quickly, and applying the mixture by spraying, rolling or painting often requires masking those areas of the surface that are not intended to be coated before application of the coating, to protect those areas from unwanted coating material. Subsequent trimming of the coating material is common to remove unwanted coating material after the coating is applied, either to provide access to the areas that ought not to be coated, such as drains or electrical outlets, or to provide a neat appearance.

One particularly useful application is the increasingly common use of spray-on coatings for liners of boxes of pick-up trucks, and interiors of vans and trucks. This application is one in which the appearance of both the coated and uncoated surfaces is particularly important, and one in which a significant amount of masking may be required. Such a spray-on liner provides protection against the corrosive elements in the atmosphere and also against the abrasion caused by various materials that may be carried in the truck, van or box.

These spray on linings have several advantages over the more conventional protection afforded by premoulded plastic liners that are inserted into the box of a pickup truck. Premoulded plastic liners do not form a water-tight seal with the body of the truck, and permit the entry of water and dirt between the liner and the truck body. This may result in substantial abrasion and corrosion to the body of the truck which is, however, not visible through the opaque liner. The loose fit of the liner results in movement of the liner against the body of the truck, increasing the abrasion damage to the truck body.

Spray-on linings, however, provide a coating, typically of polyurethane, that is tightly bonded to the truck body, and which does not permit the entry of dirt or moisture between the lining and the truck body. Also, the flexible properties of the polyurethane coating offer a slip resistant as well as protective surface for the cargo to ride on. In the case of a lining for a pick up truck box, the lining is generally applied to the floor and side walls of the box and to some portion of the top rails and side body. It is important to provide a neat edge along the perimeter of the box. The rear of the box is generally masked to avoid applying any coating to the hinges and latching mechanism, and the tail gate is generally removed and the surface facing into the box of the pickup truck is coated separately. Both this surface, and the ends of the side and bottom surfaces of the box must be trimmed to permit proper opening and closing of the door as well as providing a neat appearance.

As in the case of painting or other surface applications, the surface area that is actually covered by the sprayed on material may be determined by masking the surface that is not intended to be covered with masking tape. The material to be sprayed on the surface is intended to adhere firmly to the surface. The use of masking materials prevents contact between those portions of the surface that are not intended to be covered, and allows the rapid application of the material only to the surface which is intended to be covered. These operations generally employ masking tape having an adhesive coating that is sufficiently strong to hold the masking material in place while it is intended to be there, and yet permit the easy removal of the masking material when it is no longer required, while leaving no significant amount of adhesive material on the surface to be protected. The use of the term adhesive throughout this application generally refers to a removable adhesive having these general properties.

After the application of the coating material, however, some trimming is required to remove the coating material. This is commonly done by cutting the coating material along the boundary of the masked area, to separate the coating that is to remain in place, and which will be firmly bonded to the surface, from the coating material that is to be removed, which should not have contacted the surface and which should be separated from the surface by the masking material. Once this separation is made, it is possible to remove the masking tape, and the unwanted surface coating. It is thus important in such a trimming application to cut precisely along the edge of the masking material so that no masking material is left on the surface beneath the coating. This would result in a portion or area of coating material that is not adhered to the surface to be protected, which could subsequently result in the peeling of the protective coating from the surface. Conversely, if the cut is away from the masked edge and into the area which is intended to be coated, removal of the coating from the masked area will be more difficult and may result in the removal of paint from the truck body.

One difficulty posed by the use of the relatively thick, abrasion-resistant coatings, such as polyurethane coatings, is the difficulty in locating the edges to be trimmed. Furthermore, while the removal of masking material used in painting effectively acts as an edge trimming method, tearing or cutting the paint layer as the masking material is removed, conventional masking materials will not tear through the polyurethane coating, and often cannot be located under the relatively thicker coatings of polyurethane such as those used to line a truck box.

Various methods have been developed to overcome this difficulty. For example, several layers of masking tape may be used and layers removed sequentially so that each layer of masking tape removes individual thin layers of the coating material before the coating begins to cure. This procedure generally requires extra personnel, is a time-consuming method that leaves a relatively rough edge to the coating material as well as an inferior bond at the extreme edge of the coating.

The most common way of trimming such coatings is simply by cutting the coating along the edge of the masking material with a knife or other sharp instrument. This requires, first of all, locating the edge of the masking material, and then cutting the protective coating with a sharp instrument such as a knife. This almost invariably has the result of cutting or scoring the underlying surface, which is a particular problem with painted surfaces such pick-up truck beds and requires that the line cut or scored into the truck bed to be repainted before the vehicle can be delivered to the consumer.

An improved approach employs the use of filament-bearing masking tape, which is described U.S. Pat. Nos. 6,284,319, 6,875,469 and 7,014,900. These describe tape where a filament is embedded longitudinally between two equal width portions of a folded tape. Such tape has adhesive applied to the lower surface of the tape, which is uniform. The portion of the tape nearest the filament is substantially the same as the portion spaced away from the filament so the tape has substantially the same thickness at all points. This results in a relatively thick tape which may make positioning of the tape relatively difficult compared to a thinner tape. The prior art tape is formed from double coated adhesive tape that is folded with a filament inside the fold, resulting in a filament-bearing tape of half the width of the double coated adhesive tape. Such an approach uses a significant amount of adhesive in relation to the width of the filament-bearing tape. The thickness of the filament-bearing tape also reduces the length of tape that can be contained in a roll compared to thinner tape, such as the original double coated adhesive tape that is not folded.

SUMMARY OF THE INVENTION

The invention provides a filament-bearing masking tape extending longitudinally and formed from and including a filament and a base tape having a first edge and a second edge parallel to the first edge. The base tape includes a carrier having upper and lower sides and extending longitudinally with a first adhesive on the lower side having a first adhesive thickness, and a second adhesive having a second adhesive thickness greater than the first adhesive thickness on the upper side, and a release liner attached to the second adhesive. The filament-bearing masking tape is formed by (a) placing the filament on the lower adhesive layer, the filament extending longitudinally, parallel to the first edge of the base tape, at a filament distance from the first edge and closer to the first edge than to the second edge, and (b) folding a first portion of the base tape extending from the filament to the first edge under a second portion of the tape extending from the filament towards the second edge of the base tape so that the first adhesive on the first portion of the base tape contacts and binds to the first adhesive on the second portion of the base tape.

The invention further comprises a filament-bearing masking tape extending longitudinally and comprising a filament and a base tape having a first edge and a second edge parallel to the first edge. The base tape includes a carrier having upper and lower sides and extending longitudinally with a first adhesive on the lower side having a first adhesive thickness, and a second adhesive having a second adhesive thickness greater than the first adhesive thickness on the upper side, and a release liner attached to the second adhesive. The filament is embedded between a narrower lower portion of the base tape folded under a wider upper portion of the base tape. The first adhesive on the bottom of the wider portion of the base tape is bound to the first adhesive on the bottom of the narrower portion of the base tape. The fold in the base tape may define a longitudinal edge of the folded tape and the filament is proximate to the longitudinal edge defined by the fold in the base tape.

The release liner includes a score running longitudinally at the filament distance from the first edge of the base tape, defining a narrower portion of the release liner covering the first portion of the base tape.

The narrower portion of the release liner covering the first portion of the base tape is preferably removed.

The width of the narrower lower portion of the base tape is preferably less than 35% of the width of the wider upper portion of the base tape.

The release liner may be made from polypropylene film.

The carrier may be made from crepe paper, polypropylene, polyethylene, silicone foam rubber or polyethylene foam.

The filament may be made from an elastic synthetic material.

The filament preferably is a metal wire having a diameter of between 0.002 and 0.020 inches.

The first and second adhesives may be an acrylic adhesive, a rubber adhesive or a silicone adhesive.

The invention also provides a roll of the filament-bearing masking tape.

BRIEF DESCRIPTION OF THE DRAWINGS

FIG. 1 is a cross-sectional end view of a flat double-coated PSA tape prior to incorporation of a filament, with a score in the top release liner portion about 30% of the width of the flat tape from the left edge of the flat tape, dividing the tape into a narrower left portion and a wider right portion.

FIG. 2 is a cross-sectional end view of a strip of filament-bearing masking tape incorporating a filament between a wider upper portion and a narrower lower portion where the lower portion has been folded under a portion of the upper portion and the portion of the release liner on the lower portion has been removed.

FIG. 5 is a perspective view of the filament-bearing tape of FIG. 2 after the tape has been adhered to a surface.

FIG. 6 is an end view of the filament-bearing tape of FIG. 2 after the tape has been adhered to a surface.

DETAILED DESCRIPTION OF THE INVENTION

Figures 3, 4:
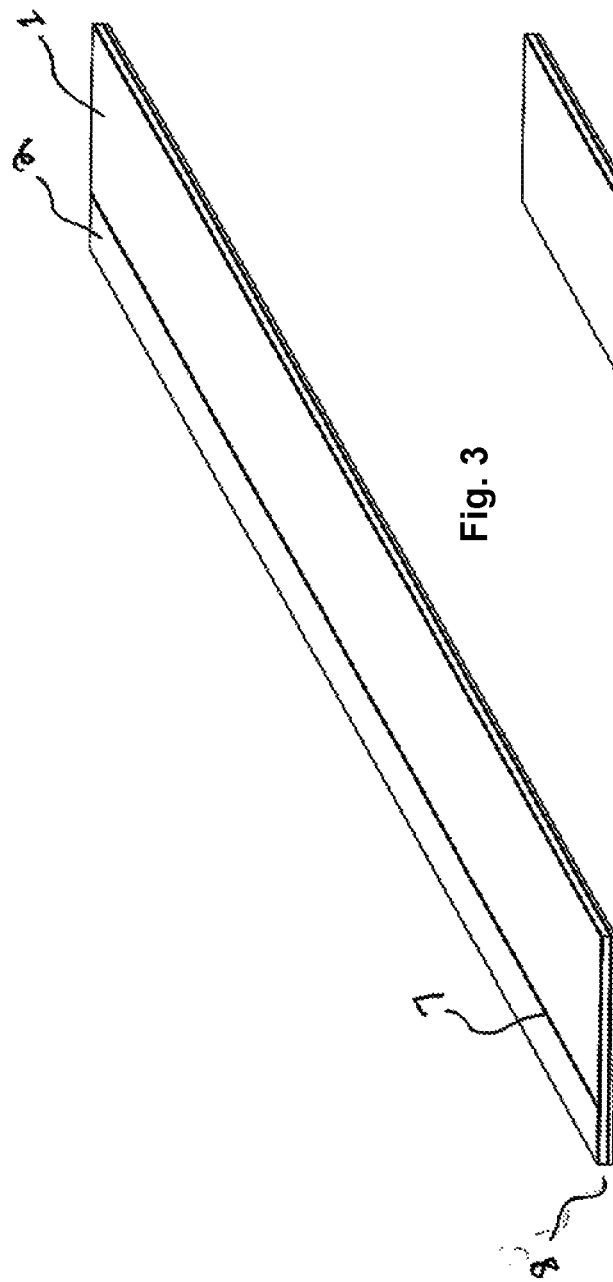
FIG. 3 is a top perspective view of the tape of FIG. 1.
FIG. 4 is a top perspective view of the filament-bearing tape of FIG. 2 showing the filament extending out from the tape.

The present invention is a new edge trimming masking tape that is well suited for trimming coatings, such as polyurethane or paint, applied to surfaces.

The following elements are numbered in the drawings.

Item no. 1: Release Liner—The release liner is preferably polypropylene film with, for example, about a 0.002 mil thickness with a silicone coating to allow for easy release of the release liner from adhesive. The release liner also serves to allow the tape to be wound onto itself on a roll and be handled without the adhesive layers sticking together. The liner may be made of silicone-treated paper or other suitable material.

Item no. 2: Release Liner (narrower piece)—As depicted, the release liner 2 is scored or cut through (see item 7) to facilitate the folding of the tape around the wire filament 6, and to facilitate subsequent removal of the narrower piece 2 of the release liner.

Item no. 3: Upper adhesive Layer—The thicker upper layer of adhesive, which may be, for example, 4 mils (0.004 inches) thick, may comprise acrylic adhesive. The adhesive may be a rubber or silicone adhesive Item no. 4: Carrier—The carrier is preferably made of polyester film. The carrier is what the adhesive layers, top/upper 3 and bottom/lower 5 are bonded to. The carrier may, for example, be made of crepe paper, polypropylene, polyethylene, or a foam product such as silicone foam rubber or polyethylene foam.

Item no. 5: Lower adhesive layer—The lower adhesive layer is the thinner layer of adhesive, which may be, for example, about 2 mils (0.002 inches) thick, preferably comprises acrylic adhesive.

Item no. 6: Filament—The filament may be a 0.010 inch diameter metal wire cutting filament. In preferred embodiments, the size may range from 0.002 inch diameter to 0.020 inch diameter. In some embodiments, the filament may be made of an elastic synthetic material, such as a monofilament nylon wire. In some embodiments, the filament may be a braided thread made from a plurality of fine strands. The material and thickness of the filament are selected based on the application for which the associated tape is intended to be used, such that the filament has sufficient tensile strength to cut the coating material it is intended to be used with when such coating is dried or cured.

Item no. 7: Score in Liner—The liner is preferably scored (cut through to the adhesive layer 3 below the liner) such that the shorter side 2 is readily removable after folding the tape over the filament 6.

Item no. 8: Double-Sided Pressure Sensitive Adhesive (PSA) Tape, including the carrier 4, two PSA adhesive layers (3 and 5) above and below the carrier 4 and a release liner 1. This configuration is referred to as a differential tape whereby the adhesive 3 is thicker on one side of the carrier than the other 5. In the depicted preferred embodiment, the upper layer 3 is thicker than the bottom layer 5. The two adhesive layers may comprise the same type of adhesive, or they may comprise different types of adhesive, e.g. a silicone adhesive on one side and acrylic on the opposite side.

Item no. 9 (FIG. 2): FIG. 2 depicts a preferred embodiment of the invention—A double side filament-bearing tape that envelopes a cutting filament 6 whereby a portion of the tape 8 has been folded over the filament 6 leaving a stronger (thicker) adhesive layer closest to the wire filament and a thinner, less aggressive adhesive exposed along the greater part of the lower surface of the tape that is attachable to the application surface where less adhesion is desired.

Item no. 10 (FIGS. 5 and 6): Application Surface—Typically painted metal surface or may be a material such as plastic, glass, fiberglass, etc.

The filament-bearing tape 9 may be produced by first forming the PSA tape 8 depicted in FIG. 1. FIG. 1 is a cross-section through the width of the PSA tape 8, which extends longitudinally, perpendicular to the drawing page, and is described above. Then, a filament 6 is placed in contact with the bottom adhesive layer 5 of the tape opposite the score 7 through the release liner. The filament 6 and the score 7 extend longitudinally along the length of the PSA tape 8. Then, the narrower portion of the tape of width W1 (see FIG. 2) corresponding to the narrower portion 2 of the release liner in FIG. 1 is folded under the wider portion of the tape corresponding to the wider portion 1 of the release liner in FIG. 1, enveloping the filament 6, with the bottom adhesive layer on the narrower portion being in contact with and bound to a portion of the bottom adhesive layer on the wider portion. Then the narrower portion of the release liner 2 attached to the lower side of the narrower portion of the filament-bearing tape 9 is removed, resulting in the depicted preferred embodiment 9 of the filament-bearing tape. This sequence described above is provided for illustrative purposes, and the described steps need not be performed in exactly the described order, as will be evident to a skilled person.

In a typical embodiment, W1 may be about 30% of the total width of the PSA tape 8, so that W1 is about 42% of the total width (W1+W2) of the filament-bearing tape 9. It is strongly preferred that W2 is substantially greater than W1. The figure 30% is an example only. For example, W1 may be in the range of 10% to 40% of the total width of the PSA tape 8, but is preferably in the range of 20% to 35% of the total width of the PSA tape 8.

The filament-bearing tape 9 may be formed into a roll to create a saleable product. The release liner 1, which remains on the upper adhesive layer 3, facilitates forming the filament-bearing tape 9 into a roll, and facilitates removal of pieces of the tape from a roll.

The filament-bearing tape 9 is designed to be adhered to a surface 10 as shown in FIGS. 5 and 6 for the purpose of coating a portion of the surface and defining a straight line edge of the coating on the surface 10 adjacent to the edge of the filament-bearing tape 9 proximate to the filament 6. For example in FIGS. 5 and 6, after a user has applied the tape as shown to the surface, the user can then coat the left portion of the surface 10, for example with polyurethane, where the polyurethane coats the left portion of the surface 10 and a portion of the filament-bearing tape 9 proximate to the filament 6. Then, generally after the coating cures, the user can pull the filament 6 up, cutting though the tape 9 at the edge of the release liner 1 proximate to the filament 6 and cutting though the coating, and then remove the filament-bearing tape 9 from the surface 10, leaving a straight edge of the coated portion.

The new filament-bearing tape 9 provides several advantages over prior art filament-bearing tapes.

The filament-bearing tape 9 allows the use of a thicker, more aggressive adhesive for attachment of the tape nearest the filament and a lesser amount of adhesive on the remainder of the tape for easier removal and less chance for leaving residue on the surface.

The adhesives may both be acrylic or they may be different types of adhesive for optimum performance in thickness and in adhesive strength requirements.

The thinner cross section of the wider portion of the tape (of width W2 in FIG. 2) allows for easier positioning by providing more flexibility than prior art filament-bearing tapes. This is particularly important, for example, for applying the tape around curves.

Compared to prior art filament-bearing tapes, the disclosed inventive filament-bearing tape 9 results in the use of less adhesive and less PSA tape needs to be used to create a similar width of filament-bearing tape. With W1 being about 30% of the width of the PSA tape, there is a minimum reduction in cost of materials of at least twenty-five percent (25%) relative to prior art filament-bearing tapes.

The thinner cross section filament-bearing tape 9 relative to prior art filament-bearing tapes allows for more tape to be stored on the same size spool—at least 10% more.

The partial fold-over (the portion of width W1 in FIG. 2) also allows a differential adhesive to secure the filament to the surface with stronger adhesion at the leading edge of the tape (i.e. the edge proximate to the filament), holding down the wire where the force from a spray gun could dislodge the tape causing the coating material to coat the surface beyond the demarcation line. The wider portion of the tape (of width W2 in FIG. 2) has less adhesive and may have an altogether different type of adhesive to allow for better removal. The lesser amount of adhesive results in less chance for adhesive residue being left on the finished surface that was meant to be protected.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description and figures as a whole.

What is claimed is:

1. A filament-bearing masking tape extending longitudinally and formed from and comprising a filament and a base tape having a first edge and a second edge parallel to the first edge, the base tape comprising a carrier having upper and lower sides and extending longitudinally with a first adhesive on the lower side having a first adhesive thickness, and a second adhesive having a second adhesive thickness greater than the first adhesive thickness on the upper side, and a release liner attached to the second adhesive, wherein the filament-bearing masking tape is formed by (a) placing the filament on the lower adhesive layer, the filament extending longitudinally, parallel to the first edge of the base tape, at a filament distance from the first edge and closer to the first edge than to the second edge, and (b) folding a first portion of the base tape extending from the filament to the first edge under a second portion of the tape extending from the filament towards the second edge of the base tape so that the first adhesive on the first portion of the base tape contacts and binds to the first adhesive on the second portion of the base tape.

2. The filament-bearing masking tape of claim 1, wherein the release liner includes a score running longitudinally at the filament distance from the first edge of the base tape, defining a narrower portion of the release liner covering the first portion of the base tape.

3. The filament-bearing masking tape of claim 2, wherein the filament-bearing masking tape is formed by further (c) removing narrower portion of the release liner covering the first portion of the base tape.

4. A roll of the filament-bearing masking tape of claim 3.

5. The filament-bearing masking tape of claim 1, wherein the release liner comprises polypropylene film.

6. The filament-bearing masking tape of claim 1, wherein the filament comprises an elastic synthetic material.

7. The filament-bearing masking tape of claim 1, wherein the filament comprises a metal wire having a diameter of between 0.002 and 0.020 inches.

8. The filament-bearing masking tape of claim 1, wherein the carrier comprises crepe paper, polypropylene, polyethylene, silicone foam rubber or polyethylene foam.

9. The filament-bearing masking tape of claim 1, wherein the first and second adhesives comprise an acrylic adhesive, a rubber adhesive or a silicone adhesive.

10. A filament-bearing masking tape extending longitudinally and comprising a filament and a base tape having a first edge and a second edge parallel to the first edge, the base tape comprising a carrier having upper and lower sides and extending longitudinally with a first adhesive on the lower side having a first adhesive thickness, and a second adhesive having a second adhesive thickness greater than the first adhesive thickness on the upper side, and a release liner attached to the second adhesive, wherein the filament is embedded between a narrower lower portion of the base tape folded under a wider upper portion of the base tape, wherein the first adhesive on the bottom of the wider portion of the base tape is bound to the first adhesive on the bottom of the narrower portion of the base tape.

11. The filament-bearing masking tape of claim 10, wherein the fold in the base tape defines a longitudinal edge of the folded tape and the filament is proximate to the longitudinal edge defined by the fold in the base tape.

12. The filament-bearing masking tape of claim 10, wherein the release liner includes a score running longitudinally at the filament distance from the first edge of the base tape, defining a narrower portion of the release liner covering the first portion of the base tape.

13. The filament-bearing masking tape of claim 12, wherein the narrower portion of the release liner covering the first portion of the base tape is removed.

14. The filament-bearing masking tape of claim 10, wherein the width of the narrower lower portion of the base tape is less than 35% of the width of the wider upper portion of the base tape.

15. The filament-bearing masking tape of claim 10, wherein the release liner comprises polypropylene film.

16. The filament-bearing masking tape of claim 10, wherein the carrier comprises crepe paper, polypropylene, polyethylene, silicone foam rubber or polyethylene foam.

17. The filament-bearing masking tape of claim 10, wherein the filament comprises an elastic synthetic material.

18. The filament-bearing masking tape of claim 10, wherein the filament comprises a metal wire having a diameter of between 0.002 and 0.020 inches.

19. The filament-bearing masking tape of claim 10, wherein the first and second adhesives comprise an acrylic adhesive, a rubber adhesive or a silicone adhesive.

20. A roll of the filament-bearing masking tape of claim 13.

* * * * *